(12) United States Patent
Miki (10) Patent No.: US 10,664,339 B2
(45) Date of Patent: May 26, 2020

(54) INFORMATION PROCESSING APPARATUS, INFORMATION PROCESSING SYSTEM, AND INFORMATION PROCESSING APPARATUS CONTROL METHOD

(71) Applicant: FUJITSU LIMITED, Kawasaki-shi, Kanagawa (JP)

(72) Inventor: Atsushi Miki, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 196 days.

(21) Appl. No.: 15/876,261

(22) Filed: Jan. 22, 2018

(65) Prior Publication Data

US 2018/0239663 A1 Aug. 23, 2018

(30) Foreign Application Priority Data

Feb. 23, 2017 (JP) ................................. 2017-032628

(51) Int. Cl.
*G06F 11/00* (2006.01)
*G06F 11/07* (2006.01)

(52) U.S. Cl.
CPC ........ *G06F 11/079* (2013.01); *G06F 11/0709* (2013.01); *G06F 11/0751* (2013.01); *G06F 11/0769* (2013.01); *G06F 11/0784* (2013.01); *G06F 11/0787* (2013.01)

(58) Field of Classification Search
CPC ............. G06F 11/0709; G06F 11/0751; G06F 11/0769; G06F 11/0787; G06F 11/079; G06F 11/0784
See application file for complete search history.

(56) References Cited

U.S. PATENT DOCUMENTS

| 2008/0082760 | A1 | 4/2008 | Onoue | |
|---|---|---|---|---|
| 2009/0316320 | A1* | 12/2009 | Maeda | B60R 16/03 361/92 |
| 2014/0215264 | A1* | 7/2014 | Ono | G06F 11/2028 714/13 |
| 2016/0004554 | A1* | 1/2016 | Minezaki | G06F 11/20 718/1 |
| 2016/0191376 | A1* | 6/2016 | Maeda | H04L 45/28 709/224 |

FOREIGN PATENT DOCUMENTS

JP 2008-090505 4/2008

* cited by examiner

*Primary Examiner* — Charles Ehne
(74) *Attorney, Agent, or Firm* — Fujitsu Patent Center (57) ABSTRACT

An alarm register stores therein failure information having a first size and related to a failure that has occurred in communication performed by each of the CPUs 103 and 104. A failure information transmitting unit reads, from the alarm register, failure information in units of a second size including a plurality of pieces of the failure information with the first size, and deletes the read failure information from the alarm register. An information acquiring unit 121 stores, in a failure information buffer 122, the failure information that has been read in units of the second size. An information notifying unit 123 reads failure information in units of the first size from the failure information buffer 122, and gives a notice of the read failure information to the CPU 103 or 104 corresponding to communication in which a failure indicated by the read failure information has occurred.

6 Claims, 8 Drawing Sheets

INFORMATION PROCESSING APPARATUS, INFORMATION PROCESSING SYSTEM, AND INFORMATION PROCESSING APPARATUS CONTROL METHOD

CROSS-REFERENCE TO RELATED APPLICATION

This application is based upon and claims the benefit of priority of the prior Japanese Patent Application No. 2017-032628, filed on Feb. 23, 2017, the entire contents of which are incorporated herein by reference.

FIELD

The embodiment discussed herein is related to an information processing apparatus, an information processing system, and an information processing apparatus control method.

BACKGROUND

In recent years, technological development has been promoted in relation to a distributed processing apparatus, such as grid computing, that performs a large amount of jobs in a distributed manner using a large number of computers connected via a network. In such a distributed processing apparatus, optical transmission is widely used for communication performed by central processing units (CPUs).

The distributed processing apparatus, upon detecting a transmission failure in communication between CPUs, acquires register information stored in registers included in a transmission control unit and an optical transmission/reception module, and stores the register information as log information in a storage area. As the optical transmission/reception module, for example, an active optical cable (AOC) that includes a connector having a built-in optical-to-electrical conversion unit may be used. The register information includes a voltage, a temperature, a vendor code, a serial number, or the like. The register information also includes failure information, such as information indicating interruption of optical signal communication, a failure in clock synchronization using a data signal, or the like.

The log information obtained at the time of occurrence of a failure is important information for specifying an object to be subjected to maintenance, and it is preferable that the failure information included in the register information is exhaustively acquired without a missing part. A time error usually occurs between when failure information is reflected in a register of the AOC and when a CPU acquires the failure information of AOC from the register of the AOC. To cope with this, the AOC holds the register information stored in the register until the register information is read by the CPU. After the CPU reads the information, the AOC clears the register.

Among registers included in the AOC, a plurality of alarm registers for storing failure information are provided depending on types of the failure information, and one byte is assigned to each of the alarm registers. Further, a unit of readout from the register is one byte. The register as described above is referred to as a register of a one-byte-based clearing-triggered-by-readout system, and is usually adopted as an alarm register of the AOC or the like as a common standard.

In some cases, the AOC may include a plurality of channels and each of the channels may be assigned to one of a plurality of CPUs. In contrast, the alarm register of the AOC has a bitmap, in which a bit is assigned to each of the channels, and pieces of information for the plurality of channels are stored in the 1-byte alarm register. A CPU performs interrupt processing upon detecting a signal transmission failure, and acquires failure information from the alarm register of the AOC. If each of CPUs that share a single AOC detects a signal transmission failure, a failure information readout operation is performed a plurality of number of times on the single AOC.

As a technology for acquiring the failure information as described above, there is a conventional technology in which a plurality of targets are monitored, and when new event information is collected, the new event information is stored in combination with existing event information that has not yet been read by a CPU.

Patent Document 1: Japanese Laid-open Patent Publication No. 2008-90505

However, when a CPU once reads failure information stored in the alarm register of the AOC, failure information corresponding to a plurality of CPUs are readout, and thereafter, the failure information corresponding to the plurality of CPUs are collectively cleared. In this case, when a single CPU reads the failure information, the alarm register is cleared after the readout; therefore, the failure information corresponding to the other CPUs may be lost in some cases. Therefore, it is difficult for a maintenance administrator to recognize occurrence of failures in the other CPUs and perform appropriate maintenance.

Furthermore, even when a conventional technology for storing the collected new event information together with the existing event information is used, if a plurality of CPUs perform readout, failure information is cleared after a certain CPU reads the failure information. Therefore, it is difficult for the other CPUs to acquire the failure information.

Moreover, as a method to cope with the situation as described above, it may be possible to use a method of causing a CPU that has read failure information to hold the all read failure information, and cause the other CPUs to use the information held by the CPU that has read the failure information when the other CPUs analyze failures. However, in this method, the amount of information to be analyzed by the other CPUs increases, and costs for the failure analysis may increase.

As another method to cope with the above-described situation, it may be possible to use a method of changing a unit of readout from the register to a unit of one bit. However, in this case, an AOC having a special specification different from a common specification is developed. Therefore, development processes and development costs may increase.

SUMMARY

According to an aspect of an embodiment, an information processing apparatus includes: a plurality of arithmetic units; a first storage unit that stores therein failure information having a first size and related to a failure which has occurred in communication performed by each of the arithmetic units; a managing unit that reads, from the first storage unit, the failure information in units of a second size which includes a plurality of pieces of the failure information with the first size, and deletes the read failure information from the first storage unit; an information acquiring unit that stores, in a second storage unit, the failure information which has been read in units of the second size by the managing unit; and an information notifying unit that reads the failure information in units of the first size from the second storage unit, and gives a notice of the read failure information to the arithmetic unit corresponding to communication in which a failure indicated by the read failure information has occurred.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Preferred embodiments of the present invention will be explained with reference to accompanying drawings. The information processing apparatus, the information processing system, and the information processing apparatus control method disclosed in the present application are not limited by the embodiments below.

Figure 1:
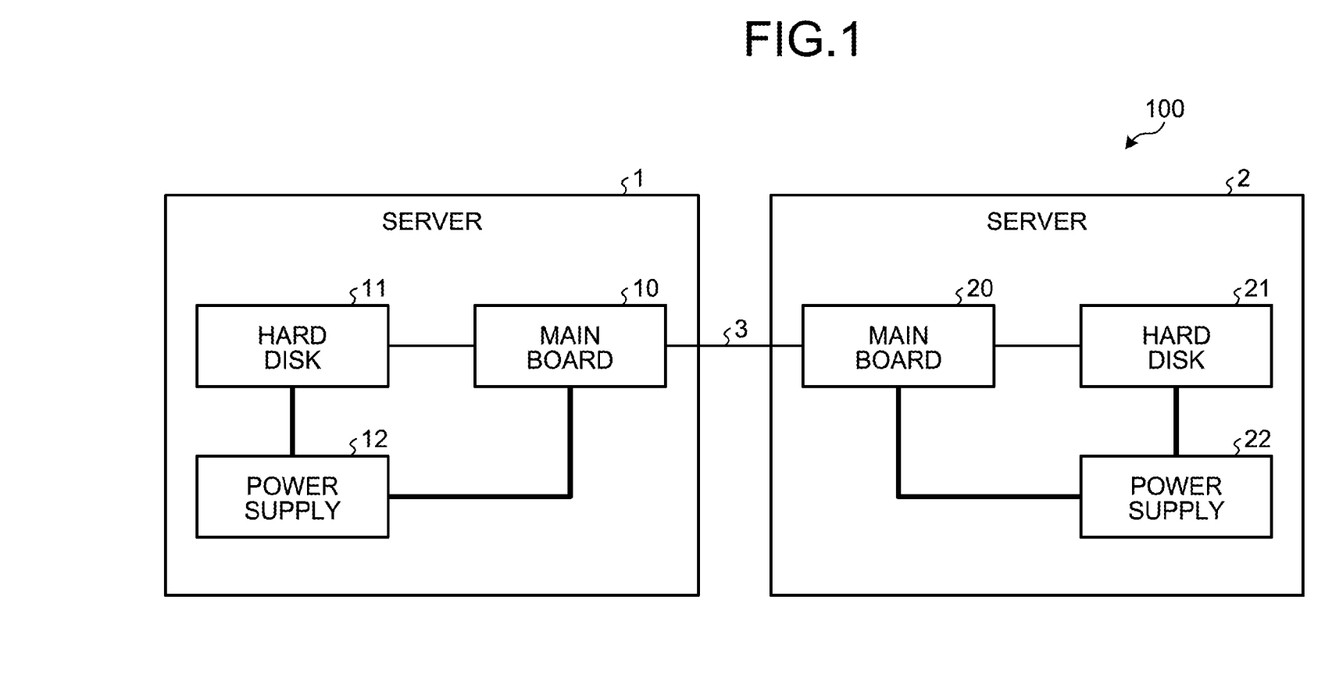
FIG. 1 is a configuration diagram of a distributed processing system according to an embodiment.

FIG. 1 is a configuration diagram of a distributed processing system according to an embodiment. A distributed processing system 100 according to the embodiment is an information processing system. The distributed processing system 100 includes a server 1 and a server 2. The server 1 and the server 2 transmit and receive signals to and from each other by using an optical cable 3.

The server 1 includes a main board 10, a hard disk 11, and a power supply 12. The server 2 includes a main board 20, a hard disk 21, and a power supply 22. In FIG. 1, thick lines represent power supply paths. In addition, thin lines connecting components represent signal transmission paths. The servers 1 and 2 are examples of an "information processing apparatus".

The main boards 10 and 20 have functions to perform arithmetic processing and communication processing. The main board 10 and the main board 20 are connected to each other by the optical cable 3. The main board 10 and the main board 20 transmit and receive signals to and from each other via the optical cable 3.

The hard disks 11 and 21 are auxiliary storage media, and store therein various programs, such as an operating system (OS) or an application. Data is read from and written to the hard disk 11 by the main board 10. Also, data is read from and written to the hard disk 21 by the main board 20.

The power supply 12 supplies electric power to each of the components including the main board 10 and the hard disk 11 in the server 1. Also, the power supply 22 supplies electric power to each of the components including the main board 20 and the hard disk 21 in the server 2.

The optical cable 3 in the present embodiment includes eight channels. In the present embodiment, two channels of the optical cable 3 are assigned to each of central processing units (CPUs) 103 and 104 as signal transmission channels. In addition, two channels of the optical cable 3 are assigned to each of the CPUs 103 and 104 as signal reception channels.

Figure 2:
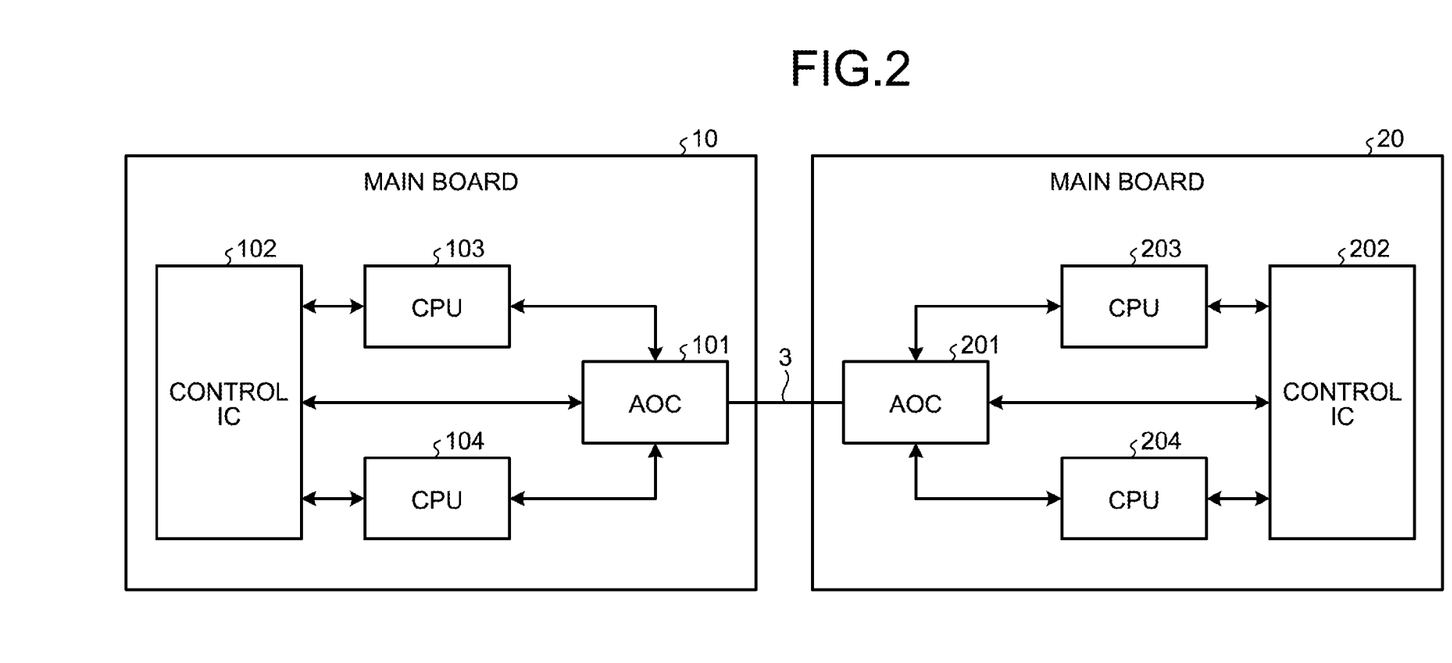
FIG. 2 is a configuration diagram of main boards.

Next, the main boards 10 and 20 will be described in detail with reference to FIG. 2. FIG. 2 is a configuration diagram of the main boards. The main board 10 includes an active optical cable (AOC) 101, a control integrated circuit (IC) 102, and the CPUs 103 and 104. The main board 20 includes an AOC 201, a control IC 202, and CPUs 203 and 204. Each of the components in the main board 10 has the same function as the function of each of the components in the main board 20; therefore, the main board 10 will be described below as an example.

The AOC 101 and the AOC 201 are connected to each other by the optical cable 3. In reality, members including the AOC 101, the AOC 201, and the optical cable 3 constitute a single AOC. That is, the AOCs 101 and 201 are terminal sections of the AOC. However, hereinafter, the terminal sections will be described as the AOCs 101 and 201.

The AOC 101 is connected to each of the CPUs 103 and 104 by a signal reception bus and a signal transmission bus. The AOC 101 is also connected to the control IC 102 by a register access bus.

Figure 3:
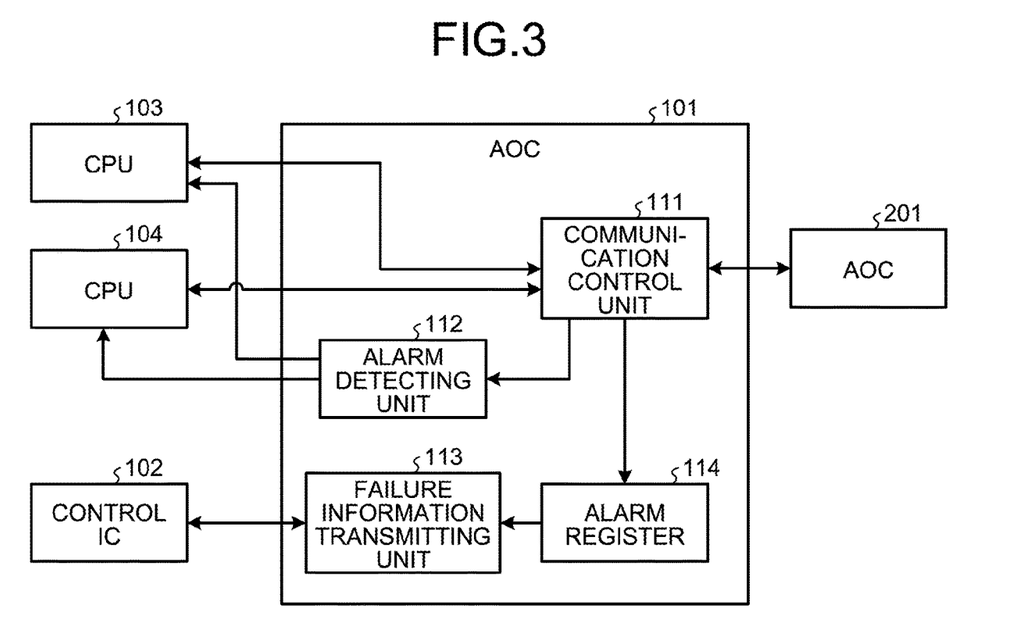
FIG. 3 is a block diagram of an AOC.

In the AOC 101, a driver that drives the AOC 101 supplies, to each of circuits, electric power that has been supplied from the main board 10. The AOC 101 performs control on signal transmission and reception to and from the AOC 201, detection of failures in signal transmission and reception, or the like. FIG. 3 is a block diagram of the AOC.

The AOC 101 includes a communication control unit 111, an alarm detecting unit 112, a failure information transmitting unit 113, and an alarm register 114. The communication control unit 111, the alarm detecting unit 112, and the failure information transmitting unit 113 are implemented by an IC including an arithmetic processing circuit and a storage circuit, or the like.

The alarm register 114 is a register of a one-byte-based clearing-triggered-by-readout system. The alarm register 114 has a bitmap, in which a bit is assigned to each of the channels of the optical cable 3. In the present embodiment, the alarm register 114 has four bits. The first bit of the alarm register 114 is assigned to the two transmission channels of the CPU 103. The second bit of the alarm register 114 is assigned to the two reception channels of the CPU 103. The third bit of the alarm register 114 is assigned to the two transmission channels of the CPU 104. The fourth bit of the alarm register 114 is assigned to the two reception channels of the CPU 104. Four bit areas for representing pieces of failure information included in 1-byte data read from the alarm register 114 is determined in advance. In the alarm register 114, a bit value of 1 indicates that a piece of failure information indicating occurrence of a failure is present, and a bit value of 0 indicates that a piece of failure information indicating occurrence of a failure is absent.

The alarm register 114 is an example of a "first storage unit". Further, one bit that is a size of each piece of failure information is an example of a "first size". Furthermore, one byte that is a unit of readout of data from the alarm register 114 is an example of a "second size".

The communication control unit 111 includes, for example, a clock data recovery (CDR), an Inter-Integrated Circuit (I2C) controller (registered trademark), a vertical cavity surface emitting laser (VCSEL), and a lens block, although they are not illustrated in the drawings.

The communication control unit 111 controls internal registers including the alarm register 114 using the I2C controller. The internal registers include a register that controls functions of the CDR and the VCSEL, in addition to the alarm register 114. The I2C controller of the communication control unit 111 is accessed by the CPUs 103 and 104 on the main board 10. The communication control unit 111 stores parameters used for optical communication designated by each of the CPUs 103 and 104 in an internal register using the I2C controller.

The communication control unit 111 receives, from the CPU 103 or 104, a transmission signal that is directed to the AOC 201. Then, the communication control unit 111 converts the transmission signal from an electrical signal to an optical signal using the VCSEL. Thereafter, the communication control unit 111 inputs the transmission signal that has been converted to the optical signal to the optical cable 3 using the lens block. Furthermore, the communication control unit 111 receives a signal transmitted from the AOC 201 via the optical cable 3. Then, the communication control unit 111 converts the received signal from an optical signal to an electrical signal using the VCSEL. The communication control unit 111 controls operations of the VCSEL using the parameters stored in the internal register.

The communication control unit 111 extracts, by using the CDR, a clock from the waveform of the received signal that has been converted to the electrical signal. Thereafter, the communication control unit 111 synchronizes the received signal using the extracted clock. Then, the communication control unit 111 outputs the synchronized received signal to the CPU 103 or 104 that serves as a destination of the signal. The communication control unit 111 controls operations of the CDP using the parameters stored in the internal register.

Furthermore, the communication control unit 111 stores history information on optical communication processing in the alarm register 114. The history information includes failure information when a failure has occurred in the optical communication. When a failure has occurred in the optical communication, the communication control unit 111 generates an alarm to give a notice of the failure. For example, when extraction of a clock from a signal using the CDR has failed, the communication control unit 111 generates an alarm to give a notice of a failure of the extraction of the clock from the signal using the CDR.

The alarm detecting unit 112 monitors communication processing performed by the communication control unit 111, and detects whether an alarm has been generated. Upon detecting that an alarm has been generated, the alarm detecting unit 112 transmits an interrupt notice of occurrence of a failure to the CPU 103 or 104 that performs optical communication in which the failure has occurred. The alarm detecting unit 112 is an example of a "detecting unit".

The failure information transmitting unit 113 receives a read request for failure information from the control IC 102. Subsequently, the failure information transmitting unit 113 acquires 1-byte data including 4-bit failure information, where each of the bits corresponds to each of the channels, from the alarm register 114. Then, the failure information transmitting unit 113 transmits the acquired 1-byte data to the control IC 102 via the register access bus. Thereafter, the failure information transmitting unit 113 clears the alarm register 114. Consequently, the alarm register 114 shifts to a state in which the failure information is not stored.

In the present embodiment, the failure information transmitting unit 113 clears the alarm register 114. However, for example, it may be possible to cause the communication control unit 111 to clear the alarm register 114 after the failure information transmitting unit 113 reads the failure information from the alarm register 114.

The CPU 103 performs communication with the CPU 203 or 204 via the communication control unit 111. Upon detecting a transmission failure in optical communication, the CPU 103 transmits a read request for failure information to the control IC 102.

Furthermore, the CPU 103 receives an interrupt notice of occurrence of a failure from the alarm detecting unit 112 of the AOC 101. Upon receiving the interrupt notice of occurrence of a failure, the CPU 103 transmits a read request for failure information to the control IC 102. The CPU 104 performs the same operations as those of the CPU 103. The CPUs 103 and 104 are examples of an "arithmetic unit".

Figure 4:
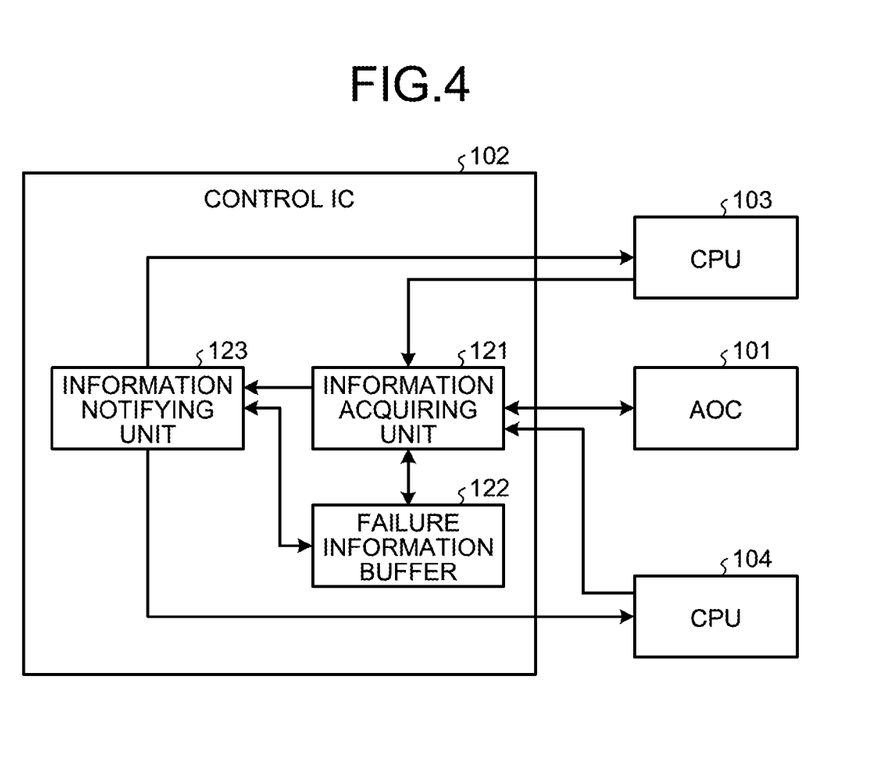
FIG. 4 is a block diagram of a control IC.

The control IC 102 is a circuit that collects failure information and holds the failure information until the failure information is read by the CPU 103 or the CPU 104. FIG. 4 is a block diagram of the control IC.

The control IC 102 includes an information acquiring unit 121, a failure information buffer 122, and an information notifying unit 123.

The failure information buffer 122 has a storage area from which each one-bit data can be read. In the failure information buffer 122, the 4-bit failure information that has been stored in the alarm register 114 is stored. In the failure information buffer 122, a bit value of 1 indicates that a piece of failure information indicating occurrence of a failure is present, and a bit value of 0 indicates that a piece of failure information indicating occurrence of a failure is absent, similarly to the alarm register 114. The failure information buffer 122 is an example of a "second storage unit".

The information acquiring unit 121 receives a read request for failure information from the CPU 103 or 104. Then, the information acquiring unit 121 transmits the read request for failure information to the AOC 101. Thereafter, the information acquiring unit 121 acquires 1-byte information that has been read from the alarm register 114, as a response to the read request for failure information. The information acquiring unit 121 acquires data from pre-set four bit positions that represent the pieces of failure information in the 1-byte information that has been read from the alarm register 114.

Then, the information acquiring unit 121 acquires the pieces of failure information held in the failure information buffer 122. Subsequently, the information acquiring unit 121 acquires a logical sum of each of the bit values of the pieces of failure information read from the alarm register 114 and each of the bit values of the pieces of corresponding failure information read from the failure information buffer 122. Thereafter, the information acquiring unit 121 stores the value of each of the logical sums of the bits of the pieces of failure information as failure information that represents a failure of each of the channels in the failure information buffer 122. Furthermore, the information acquiring unit 121 notifies the information notifying unit 123 of identification information on the CPU 103 or 104 serving as a source of the read request for failure information.

The information notifying unit 123 stores therein, in advance, correspondence between each of the bits of the 4-bit failure information stored in the failure information buffer 122 and the CPU 103 or the CPU 104. For example, the information notifying unit 123 stores therein information indicating that the first and the second bits of the 4-bit failure information stored in the failure information buffer 122 correspond to the CPU 103, and the third and the fourth bits correspond to the CPU 104.

The information notifying unit 123 receives, from the information acquiring unit 121, a notice of the identification information on the CPU 103 or 104 serving as the source of the read request for failure information. Subsequently, the information notifying unit 123 acquires pieces of failure information corresponding to the CPU 103 or 104 indicated by the received identification information from the 4-bit failure information stored in the failure information buffer 122. Then, the information notifying unit 123 transmits the pieces of acquired failure information to the CPU 103 or 104 serving as the source of the read request for failure information.

Thereafter, the information notifying unit 123 clears the pieces of failure information that have been transmitted to the CPU 103 or 104 in the 4-bit failure information stored in the failure information buffer 122. Consequently, the pieces of failure information that have already been acquired by the CPU 103 or 104 are cleared and pieces of failure information that have not yet acquired remains in the 4-bit failure information stored in the failure information buffer 122.

Figure 5:
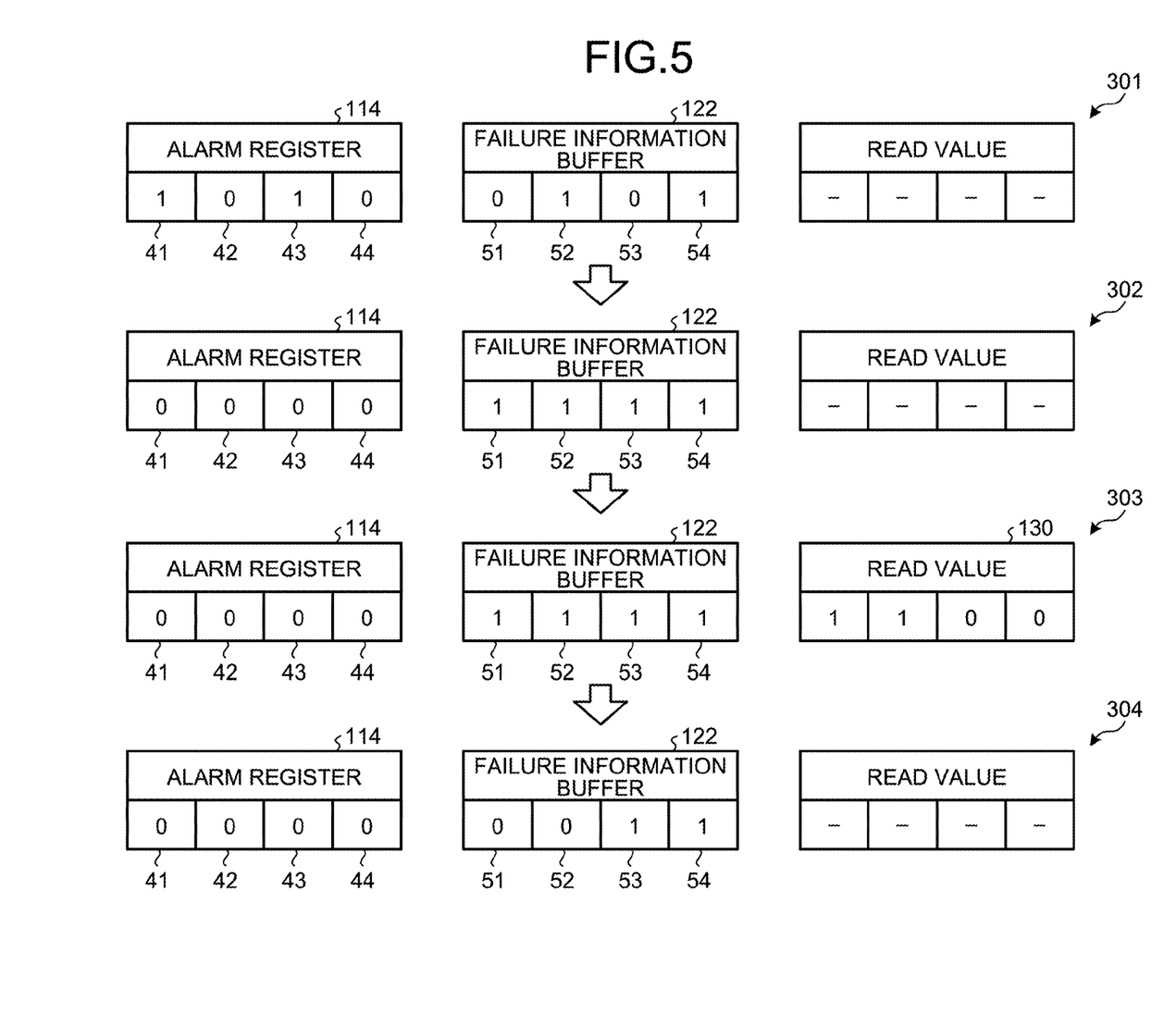
FIG. 5 is a diagram for explaining a procedure of readout from a register by a first CPU.
Figure 6:
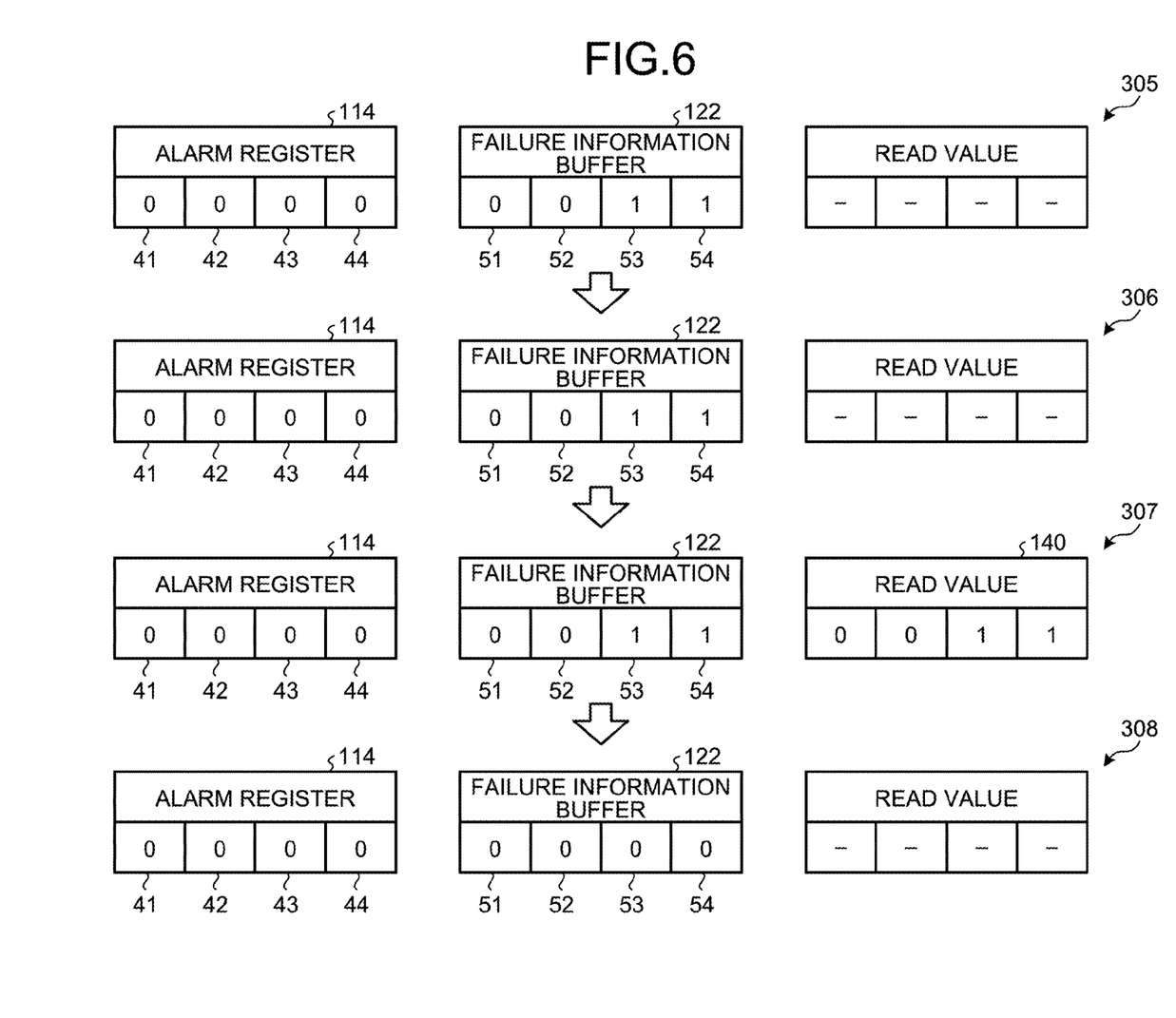
FIG. 6 is a diagram for explaining a procedure of readout from the register by a subsequent CPU.

Next, procedures of readout from the register will be described with reference to FIGS. 5 and 6. FIG. 5 is a diagram for explaining a procedure of readout from the register by a first CPU. FIG. 6 is a diagram for explaining a procedure of readout from a register by a subsequent CPU.

Hereinafter, a case will be described in which the alarm register 114 has bits 41 to 44 and the failure information buffer 122 has bits 51 to 54. The bits 41 and 51 are bits to which signal transmission channels of the CPU 103 are assigned. The bits 42 and 52 are bits to which signal reception channels of the CPU 103 are assigned. The bits 43 and 53 are bits to which signal transmission channels of the CPU 104 are assigned. The bits 44 and 54 are bits to which signal reception channels of the CPU 104 are assigned.

First, as indicated in a state 301, pieces of failure information are already stored in the bits 52 and 54 in the failure information buffer 122. Furthermore, pieces of failure information are already stored in the bits 41 and 43 in the alarm register 114. That is, the pieces of failure information on communication performed by both of the CPUs 103 and 104 are stored in the alarm register 114.

A case will be described in which the control IC 102 receives a read request for failure information transmitted from the CPU 103 in the state 301. When the failure information transmitting unit 113 receives the read request for failure information from the control IC 102, the failure information transmitting unit 113 acquires failure information from the alarm register 114. Then, the failure information transmitting unit 113 transmits the failure information acquired from the alarm register 114 to the information acquiring unit 121. Thereafter, the failure information transmitting unit 113 clears the alarm register 114, so that the alarm register 114 shifts to a state 302.

The information acquiring unit 121 acquires the failure information, in which the bit 41 has a value of 1, the bit 42 has a value of 0, the bit 43 has a value of 1, and the bit 44 has a value of 0, from the failure information transmitting unit 113. Furthermore, the information acquiring unit 121 acquires failure information, in which the bit 51 has a value of 0, the bit 52 has a value of 1, the bit 53 has a value of 0, and the bit 54 has a value of 1 as indicated in the state 301, from the failure information buffer 122. Then, the information acquiring unit 121 calculates a logical sum of the bit 41 and the bit 51, a logical sum of the bit 42 and the bit 52, a logical sum of the bit 43 and the bit 53, and a logical sum of the bit 44 and the bit 54. Thereafter, the information acquiring unit 121 stores each of the calculated logical sums in the failure information buffer 122. In this case, all of the bits 51 to 54 have the values of 1 as indicated in the state 302.

Then, the information notifying unit 123 receives the identification information on the CPU 103 from the information acquiring unit 121. Subsequently, the information notifying unit 123 acquires the values of the bits 51 and 52 corresponding to the CPU 103 in the failure information stored in the failure information buffer 122. The information notifying unit 123 then outputs the acquired values to the CPU 103. In this case, the CPU 103 acquires the values represented by a read value 130 in a state 303. In the present embodiment, it is assumed that the information notifying unit 123 transmits 4-bit failure information, in which the values of the bits other than the bits corresponding to the CPU 103 are set to zero, to the CPU 103. Therefore, the CPU 103 can detect occurrence of a failure in communication that the CPU 103 has performed.

Then, the information notifying unit 123 clears the bits 51 and 52 whose values have been acquired. With this operation, in the failure information buffer 122, the values of the bits 51 and 52 corresponding to the CPU 103 are set to zero and the values of the bits 53 and 54 corresponding to the CPU 104 are maintained as indicated in a state 304. That is, the pieces of failure information on the communication performed by the CPU 104 are not cleared.

If a failure has not occurred after the state 304, the values of all of the bits 41 to 44 are maintained as zero in the alarm register 114 as indicated in a state 305 in FIG. 6. That is, the pieces of failure information on the CPU 104 are not stored in the alarm register 114. However, in the failure information buffer 122, the values of the bits 53 and 54 are set to 1, i.e., the pieces of failure information on the CPU 104 are maintained.

Then, in the state 305, the control IC 102 receives a read request for failure information transmitted from the CPU 104. Thereafter, if the failure information transmitting unit 113 receives the read request for failure information from the control IC 102, the failure information transmitting unit 113 acquires failure information from the alarm register 114. However, the alarm register 114 is not changed after being cleared in the state 302 in FIG. 5, and therefore, the failure information transmitting unit 113 acquires zero as the value of each of the bits 41 to 44. Then, the failure information transmitting unit 113 transmits the failure information acquired from the alarm register 114 to the information acquiring unit 121. Thereafter, the failure information transmitting unit 113 clears the alarm register 114. However, because the alarm register 114 is not changed after being cleared in the state 302 in FIG. 5 and the values of all of the bits 41 to 44 are already set to zero; therefore, the state remains the same as indicated in a state 306.

The information acquiring unit 121 acquires the failure information, in which the values of all of the bits 41 to 44 are set to zero, from the failure information transmitting unit 113. Furthermore, the information acquiring unit 121 acquires the failure information, in which the bit 51 has a value of 0, the bit 52 has a value of 0, the bit 53 has a value of 1, and the bit 54 has a value of 1 as indicated in the state 306, from the failure information buffer 122. Then, the information acquiring unit 121 calculates a logical sum of the bit 41 and the bit 51, a logical sum of the bit 42 and the bit 52, a logical sum of the bit 43 and the bit 53, and a logical sum of the bit 44 and the bit 54. Thereafter, the information acquiring unit 121 stores the value of each of the calculated logical sums in the failure information buffer 122. In this case, the values of all of the bits 51 to 54 are maintained as indicated in a state 307. That is, the pieces of failure information corresponding to the CPU 104 are maintained.

Then, the information notifying unit 123 receives the identification information on the CPU 104 from the information acquiring unit 121. Subsequently, the information notifying unit 123 acquires the values of the bits 53 and 54 corresponding to the CPU 104 in the failure information stored in the failure information buffer 122. The information notifying unit 123 then outputs the acquired values to the CPU 104. In this case, the CPU 104 acquires the values represented by a read value 140 in the state 307. In the present embodiment, it is assumed that the information notifying unit 123 transmits 4-bit failure information, in which the values of the bits other than the bits corresponding to the CPU 104 are set to zero, to the CPU 104. Therefore, the CPU 104 can detect occurrence of a failure in communication that the CPU 104 has performed.

Then, the information notifying unit 123 clears the bits 53 and 54 whose values have been acquired. With this operation, in the failure information buffer 122, the values of the bits 53 and 54 corresponding to the CPU 104 are set to zero as indicated in a state 308. That is, by a combination of the clearing operation in the state 304, all pieces of the failure information on communication performed by both of the CPUs 103 and 104 are cleared.

In the present embodiment, the 4-bit failure information has been described as the failure information. However, the failure information is not limited to the four-bit information as long as the correspondence to the CPUs 103 and 104 is clearly determined. For example, it may be possible to set the failure information as 8-bit information by assigning a different bit to each of the eight channels.

Figure 7:
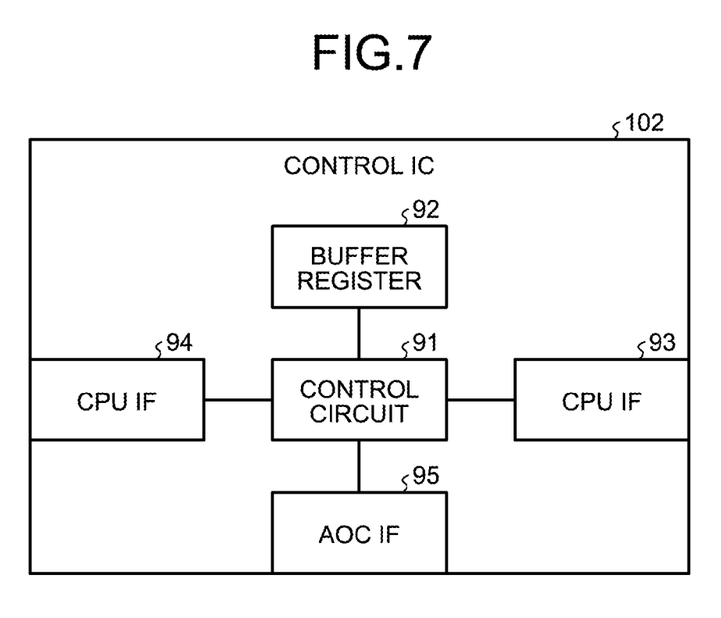
FIG. 7 is a hardware configuration diagram of the control IC.

Next, a hardware configuration of the control IC 102 will be described. FIG. 7 illustrates a hardware configuration of the control IC. The control IC 102 includes a control circuit 91, a buffer register 92, CPU interfaces (Ifs) 93 and 94, and an AOC IF 95.

The buffer register 92 implements the functions of the failure information buffer 122. The CPU Ifs 93 and 94 are interfaces for performing communication with the CPUs 103 and 104. The AOC IF 95 is an interface for acquiring information stored in the alarm register 114 included in the AOC 101.

The control circuit 91 is connected to the buffer register 92, the CPU IFs 93 and 94, and the AOC IF 95 by a bus. The control circuit 91 performs communication with the CPUs 103 and 104 via the CPU Ifs 93 and 94.

The control circuit 91 stores therein, in advance, various programs including a program for implementing the functions of the information acquiring unit 121 and the information notifying unit 123 illustrated in FIG. 4. The control circuit 91 reads and executes the various programs stored therein, to thereby implement the functions of the information acquiring unit 121 and the information notifying unit 123 illustrated in FIG. 4.

Figure 8:
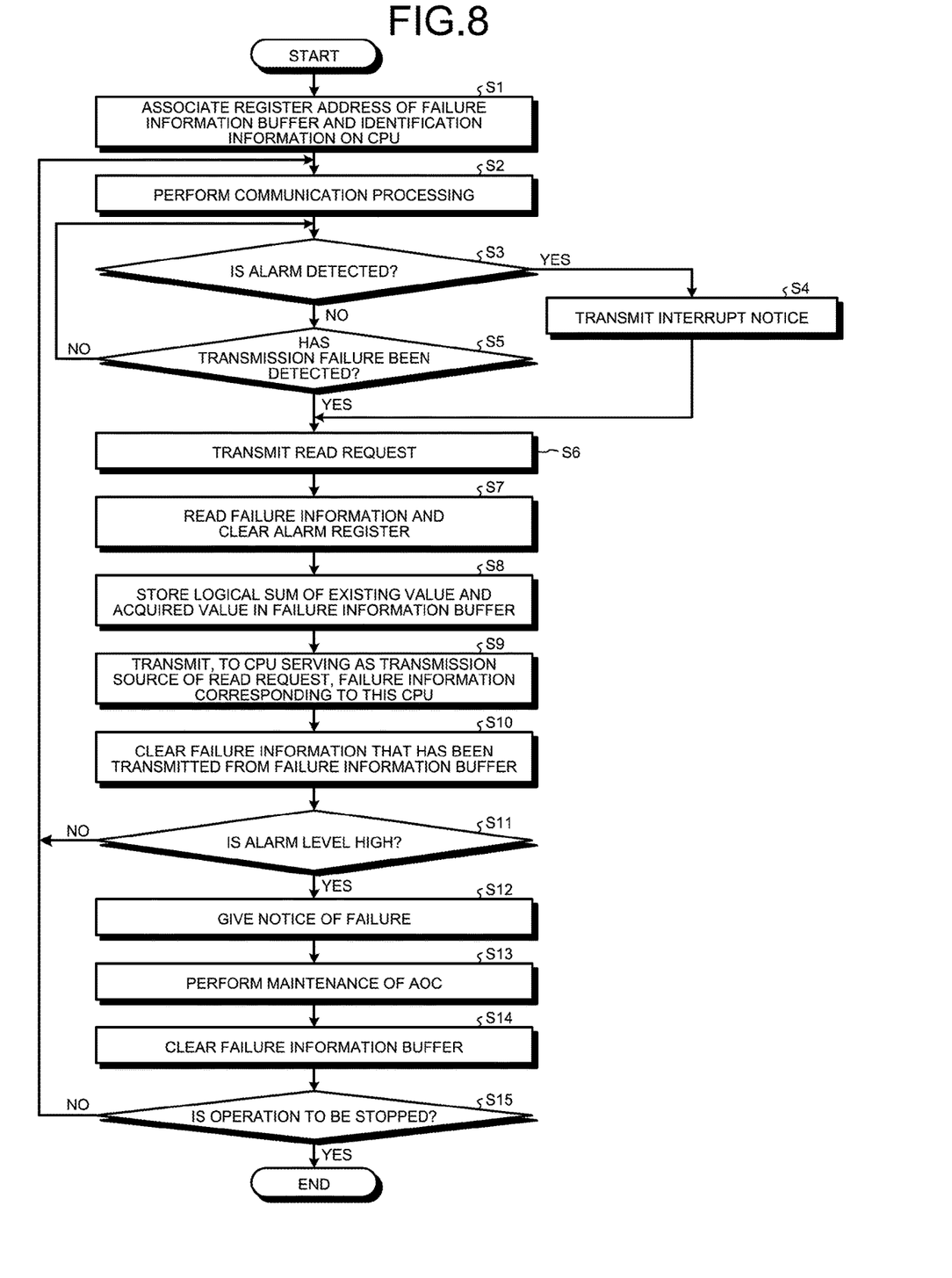
FIG. 8 is a flowchart of a failure information reading process.

Next, the flow of a failure information reading process performed by the server 1 according to the present embodiment will be described with reference to FIG. 8. FIG. 8 is a flowchart of the failure information reading process. Here, a case will be described in which a failure has occurred in communication performed by the CPU 103.

The information notifying unit 123 and the information acquiring unit 121 store a register address of the failure information buffer 122 and the identification information on each of the CPUs 103 and 104 in an associated manner (Step S1). Therefore, the information notifying unit 123 and the information acquiring unit 121 recognize correspondence between the CPU 103 or 104 and each of the four bits in which pieces of failure information are stored in the failure information buffer 122.

Subsequently, the communication control unit 111 of the AOC 101 and the AOC 201 perform optical communication processing using the optical cable 3 (Step S2).

Then, the alarm detecting unit 112 determines whether an alarm that has been generated by the communication control unit 111 is detected (Step S3). If the alarm is detected (Step S3: YES), the alarm detecting unit 112 transmits an interrupt notice to the CPU 103 that performs communication for which the alarm has been generated (Step S4), and the process proceeds to Step S6.

In contrast, when the alarm is not detected (Step S3: NO), the CPUs 103 and 104 determine whether a transmission failure has been detected in the optical communication that the CPUs 103 and 104 perform (Step S5). If the transmission failure has not occurred (Step S5: NO), the process returns to Step S3. In contrast, if the transmission failure has been detected (Step S5: YES), the process proceeds to Step S6.

Upon receiving the interrupt notice or upon detecting the transmission failure, the CPU 103 transmits a read request for failure information to the control IC 102 (Step S6). The control IC 102 transmits the read request for failure information to the failure information transmitting unit 113.

Upon receiving the read request for failure information, the failure information transmitting unit 113 reads failure information from the alarm register 114. Thereafter, the failure information transmitting unit 113 clears the alarm register 114 (Step S7). Then, the failure information transmitting unit 113 transmits the failure information to the information acquiring unit 121.

Subsequently, the information acquiring unit 121 acquires the failure information read from the alarm register 114 from the failure information transmitting unit 113. Furthermore, the information acquiring unit 121 reads, from the failure information buffer 122, an existing value of the failure information that has been stored in the failure information buffer 122. Then, the information acquiring unit 121 obtains a logical sum of the acquired value of the failure information read from the alarm register 114 and the existing value of the failure information read from the failure information buffer 122. Thereafter, the information acquiring unit 121 stores the value of the calculated logical sum in the failure information buffer 122 (Step S8).

The information notifying unit 123 acquires, from the information acquiring unit 121, the identification information on the CPU 103 that serves as a transmission source of the read request for failure information. Then, the information notifying unit 123 reads the failure information corresponding to the CPU 103 from the failure information buffer 122. Thereafter, the information notifying unit 123 transmits, to the CPU 103 that serves as the transmission source of the read request for failure information, the failure information corresponding to the CPU 103 (Step S9).

Then, the information notifying unit 123 clears the failure information that has been transmitted to the CPU 103 from the failure information buffer 122 (Step S10).

The CPU 103 receives the failure information from the information notifying unit 123. Then, the CPU 103 determines whether an alarm level is high (Step S11). Here, an alarm with a high alarm level is determined in advance, and the CPUs 103 and 104 store therein information on the alarm with the high alarm level in advance. If the alarm level is not high (Step S11: NO), the process returns to Step S2.

In contrast, if the alarm level is high (Step S11: YES), the CPU 103 gives a notice of the failure by displaying contents of the failure on a monitor, or the like (Step S12).

An administrator of the distributed processing system 100 checks information on a failure that has not yet been handled, and performs maintenance of the AOC 101 (Step S13).

After completion of the maintenance, the information notifying unit 123 clears the entire failure information buffer 122 (Step S14).

Thereafter, the server 1 determines whether the operation is to be stopped based on presence or absence of an operation stop instruction or the like issued by the administrator of the distributed processing system 100 (Step S15). If the operation is not to be stopped (Step S15: NO), the process returns to Step S2. In contrast, if the operation is to be stopped (Step S15: YES), the server 1 stops the failure information reading process.

As described above, the server according to the present embodiment keeps storing existing failure information in a buffer, in which each failure information stored in a register of the AOC can be read for each one bit, and reads and clears only failure information corresponding to the CPU that serves as a transmission source of the read request for failure information. With this configuration, even when a plurality of CPUs issue read requests for failure information, it is possible to transmit corresponding failure information to each of the CPUs, so that it is possible to reliably provide the failure information to the administrator. Consequently, the administrator can check the failure information and perform appropriate maintenance, so that the maintenance can be simplified.

Furthermore, the server according to the present embodiment uses the AOC compliant with a common standard. Therefore, it is possible to prevent an increase in manufacturing processes, manufacturing costs, and maintenance costs.

According to one aspect of the present invention, it is possible to simplify maintenance.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. An information processing apparatus comprising:
a plurality of arithmetic units each of which transmits a read request for failure information having a first size when a failure has occurred in communication performed by the arithmetic unit;
a first storage unit that stores therein the failure information and related to a failure which has occurred in communication performed by each of the arithmetic units;
a managing unit that reads, from the first storage unit, the failure information related to the communication performed by the arithmetic unit serving as a transmission source of the read request in units of a second size which includes a plurality of pieces of the failure information with the first size when receiving the instruction to read the failure information, and deletes the read failure information from the first storage unit;
an information acquiring unit that instructs the managing unit to read the failure information related to the communication performed by the arithmetic unit serving as a transmission source of the read request when receiving the instruction to read the failure information from the information acquiring unit, and that stores, in a second storage unit, the failure information which has been read in units of the second size by the managing unit; and
an information notifying unit that reads the failure information in units of the first size from the second storage unit, and gives a notice of the read failure information to the arithmetic unit corresponding to communication in which a failure indicated by the read failure information has occurred.

2. The information processing apparatus according to claim 1, wherein the information notifying unit deletes the read failure information from the second storage unit.

3. The information processing apparatus according to claim 1, further comprising:
a communication control unit that controls the communication performed by each of the arithmetic units, and stores information on the communication including the failure information in the first storage unit.

4. The information processing apparatus according to claim 1, further comprising:
a detecting unit that, when detecting occurrence of a failure in communication performed by the arithmetic unit, gives a notice of occurrence of the failure to the arithmetic unit which has performed the communication in which the failure has occurred, wherein
when the arithmetic unit detects occurrence of a failure in communication that the arithmetic unit has performed and when the arithmetic unit receives the notice of occurrence of a failure from the detecting unit, the arithmetic unit transmits a read request for the failure information to the information acquiring unit.

5. An information processing system including a plurality of information processing apparatuses, each of the information processing apparatuses including:
a plurality of arithmetic units each of which performs communication with another information processing apparatus and each of which transmits a read request for failure information having a first size when a failure has occurred in communication performed by the arithmetic unit;
a first storage unit that stores therein the failure information and related to a failure which has occurred in communication performed by each of the arithmetic units;
a managing unit that reads, from the first storage unit, the failure information in related to the communication performed by the arithmetic unit serving as a transmission source of the read request units of a second size which includes a plurality of pieces of the failure information with the first size when receiving the instruction to read the failure information, and deletes the read failure information from the first storage unit;
an information acquiring unit that instructs the managing unit to read the failure information related to the communication performed by the arithmetic unit serving as a transmission source of the read request when receiving the instruction to read the failure information from the information acquiring unit, and that stores, in a second storage unit, the failure information which has been read in units of the second size by the managing unit; and an information notifying unit that reads the failure information in units of the first size from the second storage unit, and gives a notice of the read failure information to the arithmetic unit corresponding to communication in which a failure indicated by the read failure information has occurred.

6. An information processing apparatus control method comprising:

transmitting a read request for failure information having a first size when a failure has occurred in communication performed by each of arithmetic units storing, in a first storage device, the failure information and related to a failure that has occurred in communication performed by each of the arithmetic units;

reading, from the first storage device, the failure information related to the communication performed by the arithmetic unit serving as a transmission source of the read request in units of a second size including a plurality of pieces of the failure information with the first size when receiving the instruction to read the failure information;

deleting the read failure information from the first storage device;

instructing to read the failure information related to the communication performed by the arithmetic unit serving as a transmission source of the read request when receiving the instruction to read the failure information, storing, in a second storage device, the failure information that has been read in units of the second size;

reading the failure information in units of the first size from the second storage device; and giving a notice of the failure information to the arithmetic unit corresponding to the communication in which a failure indicated by the read failure information has occurred.

* * * * *